(12) United States Patent
Koczynski

(10) Patent No.: US 10,018,974 B2
(45) Date of Patent: Jul. 10, 2018

(54) DEVICE FOR ALTERING PROCESSING OF A SIGNAL DURING PROCESSING OF THE SIGNAL, METHOD FOR PROCESSING A SIGNAL AND TANGIBLE STORAGE MEDIUM

(71) Applicant: NATIVE INSTRUMENTS GmbH, Berlin (DE)

(72) Inventor: Michael Koczynski, Berlin (DE)

(73) Assignee: NATIVE INSTRUMENTS GMBH, Berlin (DE)

( * ) Notice: Subject to any disclaimer, the term of this patent is extended or adjusted under 35 U.S.C. 154(b) by 243 days.

(21) Appl. No.: 14/499,466

(22) Filed: Sep. 29, 2014

(65) Prior Publication Data

US 2016/0092158 A1    Mar. 31, 2016

(51) Int. Cl.
   *G06F 17/00*    (2006.01)
   *G05B 15/02*    (2006.01)
   *G11B 27/038*   (2006.01)
   *G10H 1/42*     (2006.01)

(52) U.S. Cl.
   CPC .............. *G05B 15/02* (2013.01); *G10H 1/42* (2013.01); *G11B 27/038* (2013.01); *G10H 2220/116* (2013.01); *G10H 2250/641* (2013.01)

(58) Field of Classification Search
   CPC ............ G11B 27/031; G10H 2220/116; G10H 2220/101; G10H 2250/641; G10H 2250/615; G06F 3/165; G06F 3/0416; G06F 3/048; G06F 3/0484; G06F 3/04847
   See application file for complete search history.

(56) References Cited

U.S. PATENT DOCUMENTS

2011/0011245 A1*  1/2011  Adam ................. G10H 1/0066
                                                          84/612

* cited by examiner

*Primary Examiner* — Fan Tsang
*Assistant Examiner* — David Siegel
(74) *Attorney, Agent, or Firm* — Fox Rothschild LLP

(57) ABSTRACT

A device for altering processing of a signal during processing of the signal has a display unit, an input unit and a processing unit. The display unit is configured for graphically displaying at least a predetermined interval to-be-processed-next of the signal. The input unit is configured for receiving at least one of: a selection input for selecting duration of a time period within the interval and a command input for commanding altering the processing using the time period. The processing unit is configured for processing the signal and for altering the processing in response to the command input. The input unit is touch-sensitive and the processing unit is configured to control the display unit for displaying graphically the time period at least while the input unit is touched.

19 Claims, 5 Drawing Sheets

DEVICE FOR ALTERING PROCESSING OF A SIGNAL DURING PROCESSING OF THE SIGNAL, METHOD FOR PROCESSING A SIGNAL AND TANGIBLE STORAGE MEDIUM

BACKGROUND OF THE INVENTION

The device for altering processing of a signal during processing of the signal can be used in various applications. For instance, the device can be a DJ controller, the signal can be an audio signal, the processing can be a playing back of the audio signal and the altering can be a repeating of a series of pulses or beats of the audio signal. With such a device a DJ can alter tracks live during play-back by selecting a number of beats to be repeated and commanding start and/or end point in time of the repetition.

For enabling a user, e.g. a DJ, to alter the signal processing during processing an input unit and a display unit may be used. The input unit allows for a selection input for selecting the duration of the time period to-be-used for altering processing, and a command input for commanding altering the processing using the time period. The display unit makes it possible to graphically display an interval to-be-processed-next of the signal. After receiving the command input the display unit may be used to display graphically the time period.

For instance, during looping of a continuous series of beats of an audio signal, a transparent overlay indicates within the interval displayed the looped series.

SHORT SUMMARY OF THE INVENTION

Aspects of the invention relate to embodiments of a device for altering processing of a signal during processing of the signal. The device comprises a display unit for graphically displaying at least an interval to-be-processed-next of the signal; an input unit for receiving at least one of: a selection input for selecting a duration of a time period within the interval and a command input for commanding altering the processing using the time period; and a processing unit configured for processing the signal and for altering the processing in response to the command input. The input unit is touch-sensitive and the processing unit is configured to control the display unit for displaying graphically the time period at least while the input unit is touched.

Further aspects of the invention relate to embodiments of a method for processing a signal using a device comprising a touch sensitive input unit and a display unit, wherein the method comprises, during processing of the signal, graphically displaying at least an interval to-be-processed-next of the signal; using the input unit for receiving at least one of a duration of a time period to-be-used for altering processing and a command input for commanding altering the processing of the selected number of beats; and altering the processing in response to the command input. The input unit is touch-sensitive and the method comprises displaying graphically the time period at least while the input unit is touched. Yet further embodiments are related to a tangible storage medium. The tangible storage medium stores software. On execution of the software by a processing unit of a device, the method for processing of a signal is executed if the device further comprises a touch sensitive input unit and a display unit controllable by the processing unit.

There are embodiments where, after the command input is received, the time period is displayed even if the input unit is not touched.

Before the selection input is received, a preselected time period may be displayed while the input unit is touched.

The input unit may be a touch sensitive control dial wherein the duration may be selected by turning the control dial.

The control dial may comprise a push button wherein the input command is received upon pushing the button.

The signal may be an audio signal, the processing may be play back of the audio signal, the duration may be selected in units of number of beats and the processing may be altered by repeating the selected number of beats at least once.

The time period may be displayed using an overlay laid over the displayed interval. In response to the command input, a visual feature of the overlay may be altered thereby indicating the altering of the processing. The visual feature may be a transparency of the overlay.

The time period may start at a start point in time and the input unit may be further configured for receiving a change input changing the start point in time between being the current point and being a later point synchronistic with a start time of one of the beats of the signal.

The graphical display of the time period upon touching of the input unit provides a user with visual feedback of the effect of commanding altering of the processing. Hence operability is improved.

BRIEF DESCRIPTION OF THE DRAWINGS

The figures show exemplarily and schematically.

DETAILED DESCRIPTION OF THE INVENTION

The aspects, features and advantages of the present systems and methods will be appreciated when considered with reference to the following description and accompanying figures. The same reference numbers in different drawings may identify the same or similar elements. Furthermore, the following description does not limit the invention; rather, the scope of the invention is defined by the appended claims and equivalents.

Figure 1:
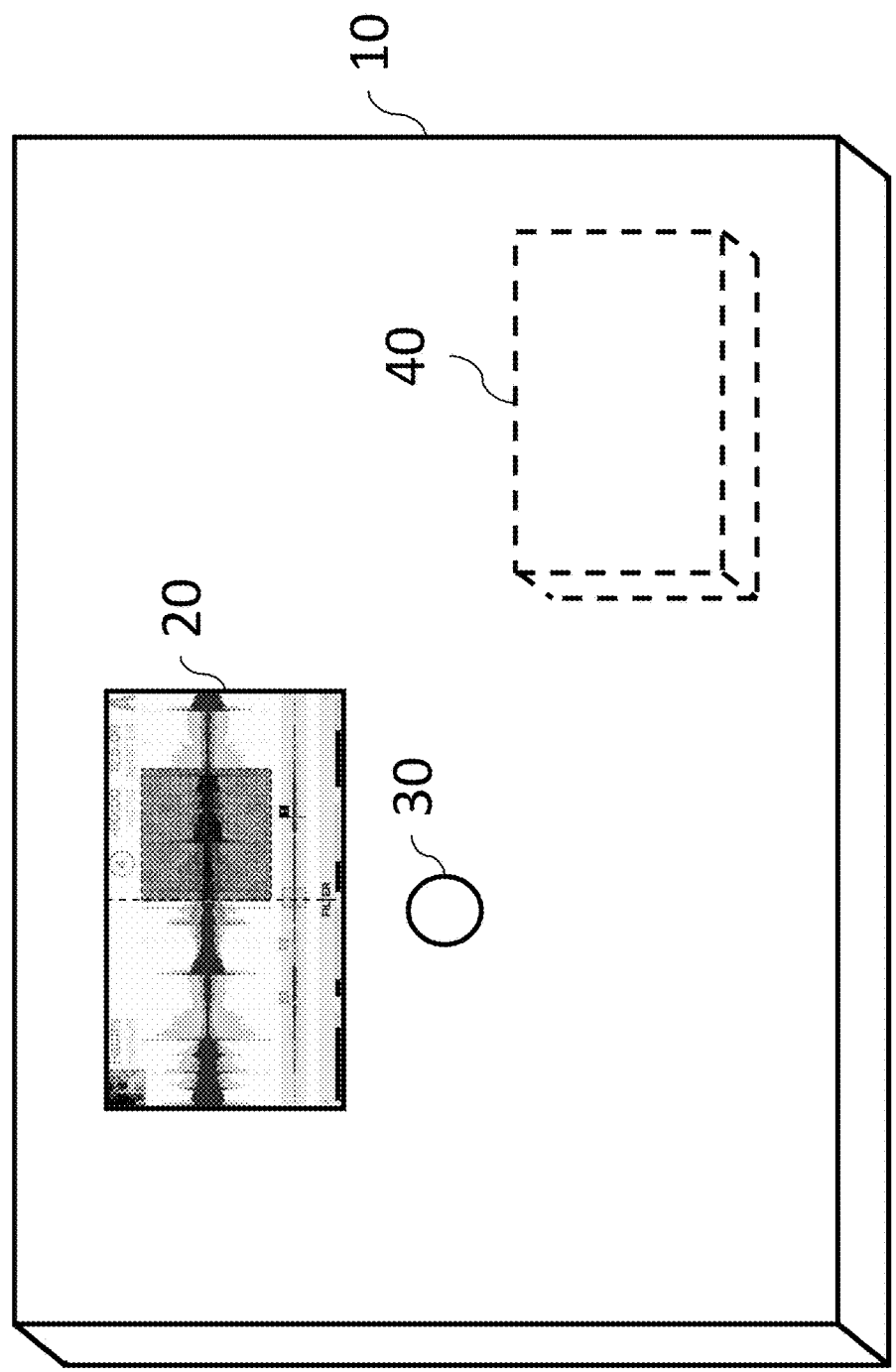
FIG. 1 an embodiment of device according to the invention.

In accordance with aspects of the invention, FIG. 1 shows, schematically, an exemplary embodiment of device according to the invention.

The exemplary embodiment is a DJ controller 10. The DJ controller 10 comprises a display 20 allowing for graphically displaying an interval of a predetermined number of beats after the current point in time and a further interval of a predetermined number of beats before the current point in time. The beats represent an audio signal during its play-back. The beats displayed are those just-played-back and to-be-played-back-next after the current point in time.

The audio signal may comprise digital audio samples.

The DJ controller 10 further comprises a touch sensitive input unit 30. The input unit 30 may be a push button, a control dial, a touch strip, a fader or a combination thereof, e.g. a control dial or a touch strip which further can be pushed. Via the input unit 30 at least one of a selection input and a command input can be received from the DJ (user). For example, a touch sensitive and pushable control dial 30 causes graphical display of a time period within the interval at least while being touched. Before the selection input is received the time period has a preselected duration. Before the command input is received the time period is a future time period lasting from a start point in time until an end point in time after the start point.

Beat quantization can be engaged such that only time periods are allowed which are in phase with the beat. Hence, if beat quantization is engaged, the start point is varying with a current point in time by being synchronized with one of the beats of the audio signal. If no beat quantization is engaged, the start point is the current point in time. The dial 30 allows selecting the duration in a number of beats to be repeated (number of beats to be looped) by turning the dial and commanding the looping of the selected number of beats by pushing the dial 30.

Since touching the input unit already causes graphical display of the time period the DJ can visualize the time period he is going to use for altering processing if providing the command input by, e.g. pushing the control dial 30. Thereby operability is eased. The DJ can easily select a contiguous series of beats for filtering, inversion, looping, echo, hall or the like.

The DJ controller 10 or other embodiments of the device may comprise further input units which are not depicted without departing from the invention. Particularly, in embodiments where the touch sensitive input unit 30 is a push button, only, a further input unit may be comprised for receiving the selection input. Other examples of further input units comprise an input unit configured for receiving a change input changing the start point to being synchronistic with the beats of the signal. That is, DJ controller 10 may comprise a toggle switch for toggling between continuous looping wherein the start point in time coincides with the current point in time always and beat quantization looping where the start point in time is synchronistic with a start time of one of the beats of the signal. Then the start point is less than a beat length after the current point in time depending of a beat phase of the signal at the current point in time.

The input unit 30 also may comprise a touch pad.

The DJ controller 10 further comprises a processing unit 40 configured for processing the signal. Since being contained within the DJ controller 10 the processing device 40 is depicted with dashed lines. The processing unit is further configured for altering the processing, for instance by repeating a section of the audio signal, the so-called looping, in response to the command input. The processing unit is yet further configured for controlling the display unit to display graphically the time period at least while the input unit 30 is touched.

Particularly, the processing unit is configured to display graphically, in response to receiving a touch input through the input unit, a "preview" of the time period to-be-used. That is, in the exemplary embodiment described the preview is displayed before the command input is received. Additionally or alternatively, before the selection input is received, duration of the time period corresponds to a preselected number of beats. The pre-selection may be the duration of a previous time period used for altered processing or default duration.

Configuration of the processing unit may be achieved by software stored on a tangible storage medium such as, for instance, a ROM, a CD, a DVD, a flash memory device or the like.

Figure 2:
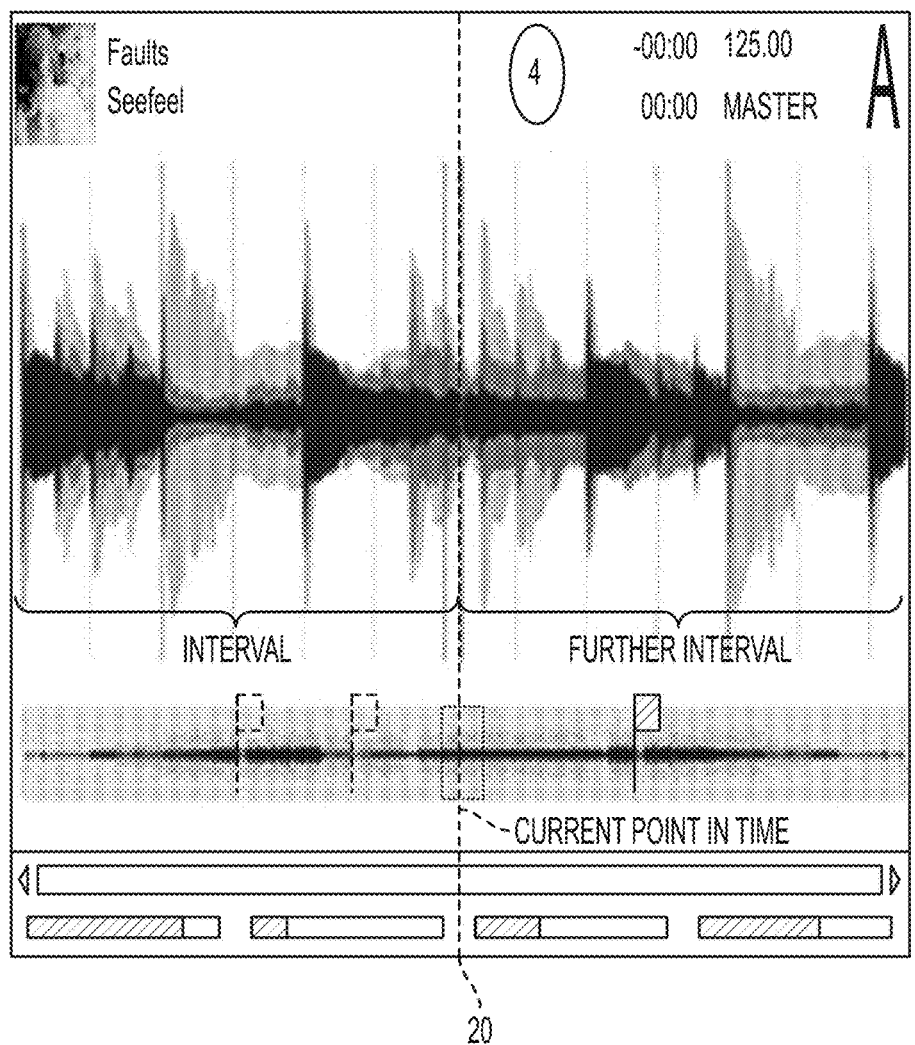
FIG. 2 a graphical display of an interval to be-played-back next of an audio signal after a current point in time and a further interval just played back of an audio signal before current point in time, FIG. 3 a graphical display of the interval and the further interval with a transparent overlay indicating a time period to be used for altering processing of the signal, FIG. 4 a graphical display of the interval and the further and of another transparent overlay of different transparency indicating a time period used for altering processing of the signal, and FIG. 5 a state diagram of the device.
Figure 3:
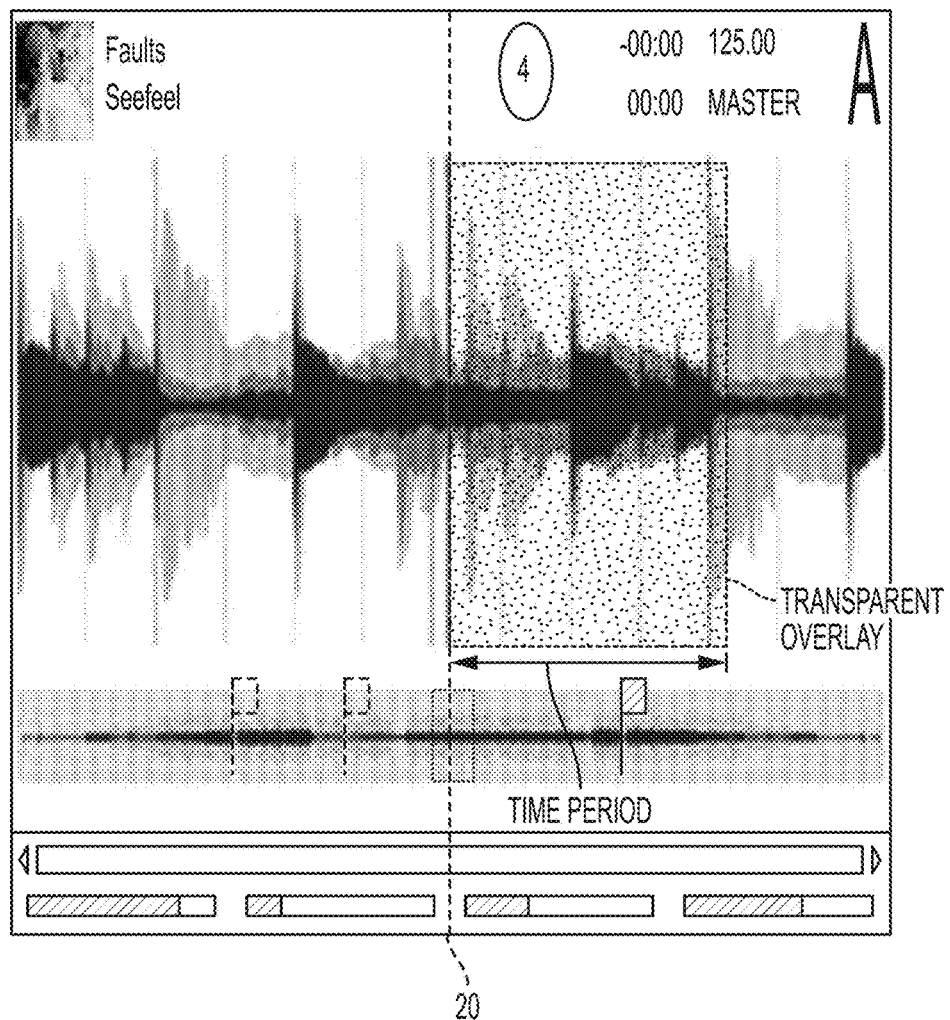

While playing back the audio signal the exemplary DJ controller of FIG. 1 displays graphically an interval of beats to-be-played-back-next after the current point in time and a further interval of beats already played back until the current point in time. E.g. a waveform of the audio signal is graphically displayed as exemplarily depicted in FIG. 2. Once the dial 30 is touched, the displayed interval is overlaid with a transparent overlay, e.g. a transparent window or a transparent bar, representative of a time period to-be-used for altering processing as exemplarily depicted in FIG. 3. Additionally or alternatively, graphical items identifying the start point and the end point may be used for representing the time period. In case of altering processing by looping, the DJ control may enable switching between continuous looping, i.e. when no beat quantization is engaged, where the overlay ranges from the current point in time to an end point in time, and discontinuous looping, i.e. when beat quantization is engaged, where the overlay starts at a later point in time. The later point is later in time than the current point and synchronistic with one of the beats of the audio signal. I.e. the later point is not earlier in time than the current point and less than one beat later in time than the current time. The end point in time is determined by the duration which is determined by the degree the dial 30 is turned. If the dial 30 is not turned the duration may be the duration of a time period previously used for altering processing or a default duration. The width of the overlay hence corresponds to the duration of the time period to be used for altering processing.

Figure 4:
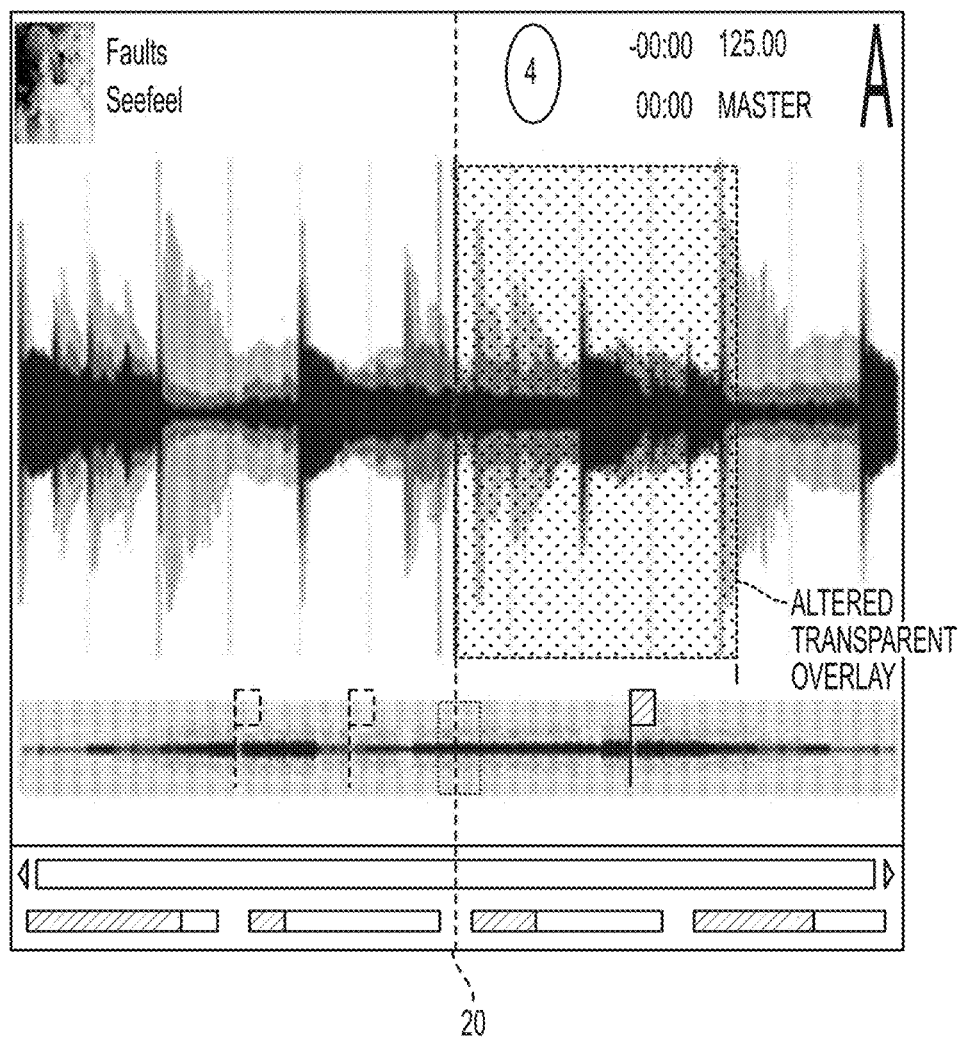

Before the command input is received, the transparent overlay graphically depicted while the input unit being touched represents the time period to-be-used for altering processing. After the command input is received, the transparent overlay graphically depicted represents the time period used for altering processing. After the command input is received the overlay may be displayed even if the input unit 30 is not touched and/or transparency of the overlay may be altered as exemplarily depicted in FIG. 4.

Figure 5:
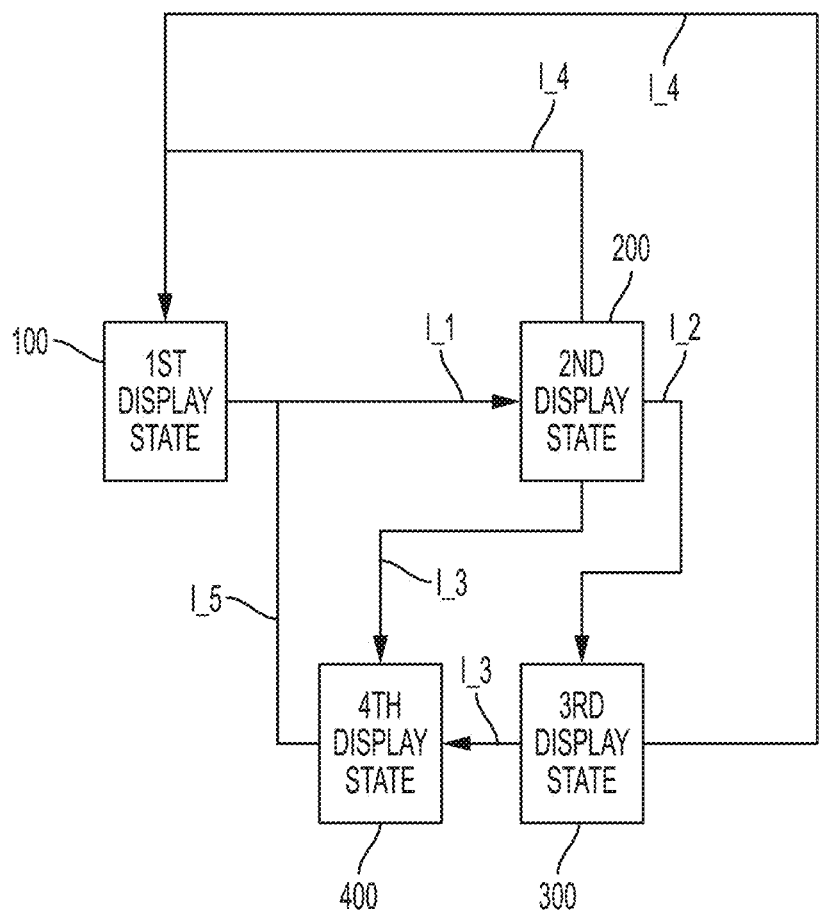

In the state diagram exemplarily depicted in FIG. 5, the device is in one of four display states. Transitions between the display states occur in response to five kinds of user inputs via the input unit. In a first display state 100 only the interval and the further interval is displayed as shown exemplarily in FIG. 2. A first input I_1, touching the input unit, causes shift from first display state 100 to second display state 200. In the second display state 200 a transparent overlay corresponding to a time period is displayed, as shown exemplarily in FIG. 3, in addition to the interval wherein the time period has a preselected or predetermined duration. A second input I_2, e.g. turning the input unit, causes transition from the second display state 200 to a third display state 300. In the third display state 300 the width of the transparent overlay is changed in accordance with a change of the duration as indicated by the turning. A third input I_3, e.g. pushing the input unit, cause transition to a fourth display state 400 from each of the second display state 200 and the third display state 300. A fourth input I_4, terminating touching of the input unit, cause transition to the first display state 100 from each of the second display state 200 and the third display state 300. In the fourth display state 400 a different overlay of different transparency is displayed.

A fifth input I_5, e.g. another pushing of the input unit, causes transition from the fourth display state 400 to the second display state 200 and termination of the looping.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

What is claimed is:

1. A device for altering signal processing of a signal, comprising:
   a display unit configured to graphically display at least an interval of the signal that is to be processed next;
   an input unit configured to receive at least one of
   a selection input for selecting a value for an alterable duration of a time period within the interval, and
   a command input for commanding alteration of the signal processing based on the time period; and
   a processing unit configured to process the signal and to alter the signal processing in response to the command input;
   wherein the input unit is touch-sensitive such that a graphical display of the time period is caused in response to a touching of the input unit and prior to the input unit's reception of the selection or command input; and
   wherein the processing unit is configured to control the display unit for graphically displaying the time period at least while the input unit is being touched;
   wherein the input unit is a touch sensitive control dial; and
   wherein the duration of the time period is selected by turning the control dial.

2. The device of claim 1, wherein, after the command input is received, the time period is displayed even if the input unit is not touched.

3. The device of claim 1, wherein, before the selection or command input is received, the alterable duration of the time period is set to a pre-selected value.

4. The device of claim 1, wherein the control dial comprises a push button and the command input for altering the signal processing is received upon pushing the push button.

5. The device of claim 1, wherein the signal is an audio signal, the signal processing is play back of the audio signal, the value of the alterable duration is selected in units of number of beats, and the signal processing is altered by repeating the selected number of beats at least once.

6. The device of claim 1, wherein the time period is displayed using an overlay laid over the displayed interval.

7. The device of claim 6, wherein, in response to the command input, a visual feature of the overlay is altered thereby indicating the altering of the signal processing.

8. The device of claim 7, wherein the visual feature is a transparency.

9. The device of claim 1, wherein:
   the time period starts at a start point in time; and
   the input unit is further configured to receive a change input changing the start point in time between being a current point and being a later point synchronistic with a start time of a beat of the signal.

10. A method for processing of a signal using a device comprising an input unit and a display unit, the method comprising:
    graphically displaying, by the display unit, at least an interval of the signal that is to be processed next;
    using the input unit to receive at least one of
    a selection input for selecting a value for an alterable duration of a time period within the interval, and
    a command input for commanding altering the processing using the time period; and
    altering the processing in response to the command input;
    wherein the input unit is touch-sensitive such that a graphical display of the time period is caused in response to a touching of the input unit and prior to the input unit's reception of the selection or command input;
    wherein the time period is graphically displayed at least while the input unit is being touched;
    wherein the input unit is a touch sensitive control dial; and
    wherein by a turning of the control dial the duration is selected.

11. The method of claim 10, further comprising displaying, once the command input is received, the time period even if the input unit is not touched.

12. The method of claim 10, wherein, before the selection input is received, the alterable duration of the time period is set to a preselected value.

13. The method of claim 10, wherein the control dial comprises a push button and the input command is received upon pushing the button.

14. The method of claim 10, wherein the signal is an audio signal, the processing is play back of the audio signal, and the processing is altered by repeating a selected number of beats at least once.

15. The method of claim 10, wherein the time period is displayed using an overlay laid over a displayed predetermined number of beats.

16. The method of claim 15 wherein, in response to the command input, a visual feature of the overlay is altered thereby indicating the altering of the processing.

17. The method of claim 16, wherein the visual feature is a transparency of the overlay.

18. The method of claim 10, wherein
    the time period starts at a start point in time, and
    the method further comprises receiving a change input changing the start point between being a current point in time and being a later point in time synchronistic with a beat of the signal.

19. A non-transitory tangible storage medium storing software wherein on execution of the software by a processing unit of a device further comprising a touch sensitive input unit and a display unit controllable by the processing unit, the method of claim 10 is executed.

* * * * *